United States Patent
Morita

(10) Patent No.: US 8,238,630 B2
(45) Date of Patent: Aug. 7, 2012

(54) IMAGE PROCESSING APPARATUS AND PROGRAM FOR THE SAME

(75) Inventor: Junya Morita, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 782 days.

(21) Appl. No.: 12/327,536

(22) Filed: Dec. 3, 2008

(65) Prior Publication Data

US 2009/0141955 A1   Jun. 4, 2009

(30) Foreign Application Priority Data

Dec. 4, 2007   (JP) ................................. 2007-313438

(51) Int. Cl.
*G06K 9/00* (2006.01)
(52) U.S. Cl. .......................... 382/128; 382/131; 600/410
(58) Field of Classification Search .................. 382/128, 382/131; 600/410
See application file for complete search history.

(56) References Cited

U.S. PATENT DOCUMENTS

| | | | |
|---|---|---|---|
| 6,674,880 B1 * | 1/2004 | Stork et al. | 382/128 |
| 6,744,849 B2 * | 6/2004 | Nagatsuka | 378/62 |

* cited by examiner

*Primary Examiner* — Hrayr A Sayadian
(74) *Attorney, Agent, or Firm* — Birch, Stewart, Kolasch & Birch, LLP

(57) ABSTRACT

Improving diagnosis performance by matching the appearances of images while maintaining difference arising from the difference in tissue structure without being influenced by a non-interest region. Two medical images are divided into a plurality of tissue regions, each with each tissue imaged therein, and a similarity level is calculated for each corresponding pair of the plurality of tissue regions between the two medical images based on the form of each tissue region. An interest level is set for each corresponding pair and a weigh is obtained for each corresponding pair according to the similarity level and interest level. An image processing condition is set such that the matching level of an image characteristic of each corresponding pair is varied according to the weight, and image processing is performed on at least either one of the two medical images according to the set image processing condition.

17 Claims, 7 Drawing Sheets

HISTOGRAM $H_{OA}$

MAMMARY GLAND REGION HISTOGRAM $H_{OA}$-G

FATTY REGION HISTOGRAM $H_{OA}$-F

PECTORAL MUSCLE REGION HISTOGRAM $H_{OA}$-K

×0.40   ×0.27   ×0.08

HISTOGRAM $H_A$

HISTOGRAM $H_{OB}$

MAMMARY GLAND REGION HISTOGRAM $H_{OB\text{-}G}$

FATTY REGION HISTOGRAM $H_{OB\text{-}F}$

PECTORAL MUSCLE REGION HISTOGRAM $H_{OB\text{-}K}$

×0.40  ×0.27  ×0.08

HISTOGRAM $H_B$

IMAGE PROCESSING APPARATUS AND PROGRAM FOR THE SAME

BACKGROUND OF THE INVENTION

1. Field of the Invention

The present invention relates to an image processing apparatus for facilitating comparative reading of a plurality of medical images. The invention also relates to a computer readable recording medium on which is recorded a program for causing a computer to perform functions of the image processing apparatus.

2. Description of the Related Art

Heretofore, X-ray images have been obtained by irradiating radiation onto subjects for diagnosing diseases. Recently, in particular, a radiation image generation method that uses a radiation detector, such as stimulable phosphor, a flat panel detector (FPD), or the like, in place of a film, and directly derives a radiation image from the detector as a digital image has been used.

In order to find out a lesion from such images, it is important to compare past and present images of the same patient and observe a change between the images. For example, a plurality of image obtained for the same subject is displayed, arranged side by side, on a high-resolution display device and a diagnosis is performed by comparing them with each other. Where the past image and present image are obtained by radiographic machines of different models, or obtained by the same machine but under different imaging conditions, however, image characteristics (density value, contrast, tone, and the like) differ greatly between the images. There has been a case in which the difference in the image characteristics has become an obstacle to the comparative reading, and diagnostic accuracy and efficiency have been degraded.

Consequently, a technology for modifying image data using auxiliary information, such as imaging conditions and the like, attached to a radiation image so that the image characteristics correspond to each other between a plurality of images, thereby correcting the difference due to the difference in imaging conditions and the like, is proposed.

Such correction of difference is based on the assumption that the auxiliary information is attached to the obtained image data. The auxiliary information, however, is not attached to a radiation image obtained by an old-type radiographic machine, although it is attached to a digital image used in recent years. Otherwise, there may be a case that the auxiliary information is not sufficient due to the use of radiographic machines provided by different manufacturers. As such, the technology described above has problems that the modification for comparative reading can not be performed or even if a certain modification is performed, the result is not so effective.

Consequently, a method that includes the following steps is proposed as described, for example, in U.S. Pat. No. 6,744,849: selecting a reference image from a plurality of radiation images of the same region of the same subject; recognizing or specifying corresponding regions in the reference image and a similar image to obtain the image data; comparing the corresponding regions between the two images, and performing image processing so that the image characteristics of the reference image and similar image correspond to each other.

In the mean time, a mammography image is diagnosed focusing on a mammary gland region, and a chest image is diagnosed focusing on a lung field region. Therefore, use of such region as the specific region for matching the image characteristics, as in U.S. Pat. No. 6,744,849, allows the characteristics of the interest region to be matched without affected by a non-interest region that does not require any attention in comparison with the case in which the entire image is used.

The method for matching image characteristics between two images based only on a specific region, however, has the following problems.

Where a lesion is present in the specific region, the difference due to the lesion would also be eliminated. For example, in the case of a mammography image, a mass lesion is often found in the mammary gland region, so that if the image characteristics are matched based only on the mammary gland region, such lesion becomes less visible.

Further, the difference in thickness or amount of tissue due to difference in positioning would also be eliminated. For example, in the case of a mammography image, overlapping extent of mammary gland varies largely according to the positioning. More specifically, in certain positioning, the mammary gland does not stretch widely and the mammary gland mass appears more whitish on the image. With respect to two images that differ greatly in positioning, if a correction is made to match the image characteristics of the mammary gland region, the appearance of the mammary gland region corresponds to each other between the two images, but the appearances of the other regions differ greatly. That is, when the tissue structures are different in the first place, the difference should be left as it is. Despite this, difference arising from the difference in tissue structure is also eliminated.

The present invention has been developed in view of the circumstances described above, and it is an object of the present invention to provide an image processing apparatus capable of improving diagnosis performance by matching the appearances of images while maintaining difference arising from the difference in tissue structure without being influenced by a non-interest region. It is a further object of the present invention to provide a computer readable recording medium on which is recorded a program for causing a computer to perform functions of the image processing apparatus.

SUMMARY OF THE INVENTION

An image processing apparatus according to the present invention is an apparatus, including:

an image storage means for storing two medical images obtained by imaging the same region that includes a plurality of tissues;

an image dividing means for dividing the two medical images into a plurality of tissue regions, each with each of the plurality of tissues imaged therein;

a similarity level calculation means for calculating a similarity level for each corresponding pair of the plurality of tissue regions divided by the image dividing means between the two medical images based on the form of each tissue region thereof;

an interest level setting means for setting an interest level for each corresponding pair;

an image processing condition setting means for obtaining a weight for each corresponding pair according to the similarity level calculated by similarity level calculation means and the interest level set by the interest level setting means, and setting an image processing condition for approximating an overall image characteristic between the two medical images based on image information included in each corresponding pair such that the greater the weight of a corresponding pair, the higher the matching level of image characteristic between the pair; and an image processing means for performing image processing on at least either one of the two medical images according to the image processing condition set by the image processing condition setting means.

A computer readable recording medium according to the present invention is a computer readable recording medium on which is recorded a program for causing a computer to function as:

an image storage means for storing two medical images obtained by imaging the same region that includes a plurality of tissues;

an image dividing means for dividing the two medical images into a plurality of tissue regions, each with each of the plurality of tissues imaged therein;

a similarity level calculation means for calculating a similarity level for each corresponding pair of the plurality of tissue regions divided by the image dividing means between the two medical images based on the form of each tissue region thereof;

an interest level setting means for setting an interest level for each corresponding pair;

an image processing condition setting means for obtaining a weight for each corresponding pair according to the similarity level calculated by similarity level calculation means and the interest level set by the interest level setting means, and setting an image processing condition for approximating an overall image characteristic between the two medical images based on image information included in each corresponding pair such that the greater the weight of a corresponding pair, the higher the matching level of image characteristic between the pair; and an image processing means for performing image processing on at least either one of the two medical images according to the image processing condition set by the image processing condition setting means.

The term "tissue" as used herein refers to one of the constructs forming each region of a subject and is a mass of cells having the same function and structure.

The term "tissue region" as used herein refers to a region on a medical image where each tissue is imaged. Each tissue appears in the medical image with distinctive density value, shape, and position, so that the medical image may be divided into each tissue region according to the density value, shape, and position. Where the boundary of a tissue with another tissue is not clear, the tissue region of the tissue may be determined according to the amount of tissue appearing in the region.

The term "form of each tissue region" as used herein refers to the shape or appearance of the tissue region. More specifically, it refers to the area or shape of the tissue region.

The "image processing condition" may be set in a manner so that image processing is performed on each of the two medical images, or in a manner so that image processing is performed on either one of the two medical images with reference to the other medical image.

The form of each tissue region described above may be the shape and/or area of the tissue region.

Where the two medical images are mammography images, the plurality of tissue regions are a mammary gland region, a fatty region, and a pectoral muscle region.

Further, it is preferable that the image characteristic is at least one of the density value, contrast, and tone.

According to the present invention, a similarity level for each corresponding pair of tissue regions between medical images is obtained based on the form of each tissue region thereof. Then, an interest level is set for each corresponding pair and a weight of each corresponding pair is obtained according to the similarity level and interest level. Then an overall image characteristic is approximated between the medical images based on image information included in each corresponding pair such that the greater the weight of a corresponding pair, the higher the matching level of image characteristic between the corresponding pair. This allows the image characteristic to be changed such that the appearance of an image portion not having difference becomes identical while maintaining difference arising from the difference appeared in a tissue, such as a lesion, whereby the diagnosis may be performed accurately.

Further, use of the shape or area of a tissue region for the calculation of the similarity level to change the image processing allows understanding as to whether or not a change has occurred in the tissue region.

Still further, where the two medical images are mammography images, the image characteristics may be matched precisely by dividing the images into a mammary gland region, a fatty region, and a pectoral muscle region, then obtaining a similarity level of each corresponding pair of tissue regions between the two mammography images, and matching the image characteristics between the images by further setting an interest level of each corresponding pair.

Further, performance of image processing such that one of the density value, contrast, and tone corresponds to each other between the images allows the appearances of the images to be approximated more closely.

DESCRIPTION OF THE PREFERRED EMBODIMENTS

Figure 1:
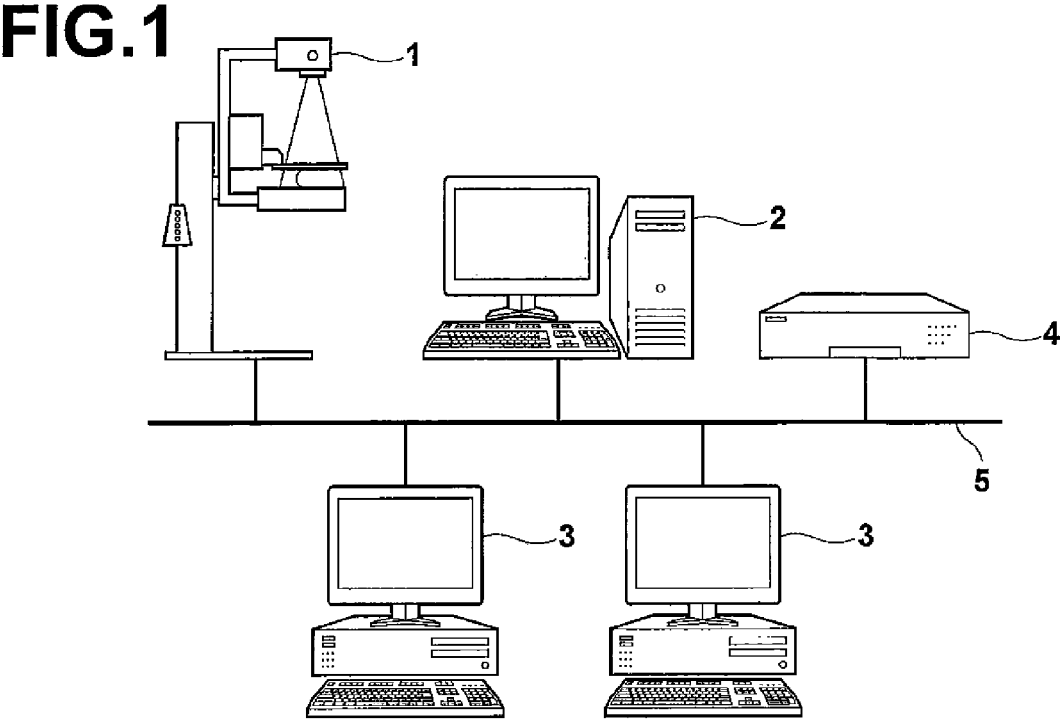
FIG. 1 is a schematic configuration diagram of a medical information system.

FIG. 1 illustrates a schematic configuration of a medical information system to which an image processing apparatus according to an embodiment of the present invention is applied. As illustrated in FIG. 1, the system includes network 5 communicatably connecting radiographic machine (modality) 1 for obtaining medical images; image quality inspection workstation 2 (QA-WS); radiological reading workstations 3 (3a, 3b); and image management server 4.

Network 5 is a local area network connecting various devices and equipment in a hospital. Where radiological reading workstation 3 is also installed in another hospital or clinic, network 5 may have a configuration in which the local area network of each hospital is linked by the Internet or a dedicated line. In either case, network 5 is desirable to be a network that allows high-speed image transfer, such as optical network or the like.

Modality 1 includes a unit that generates a medical image by imaging a target region of a subject and outputs the image by attaching thereto auxiliary information that complies with DICOM standard. The auxiliary information may be based on the standard unique to the manufacture of the modality. In the present embodiment, an image obtained by a radiographic X-ray machine and digitized by a CR unit is used. The radiographic X-ray machine records a radiation image of a subject on storage phosphor sheet IP having a sheet-like storage phosphor layer. The CR unit is a unit that scans excitation light, such as laser light, on storage phosphor sheet IP recorded by the radiographic X-ray machine to generate stimulated luminescence light, photo-electrically reads out the obtained stimulated luminescence light to obtain an analog signal, performs a logarithmic conversion on the analog signal, and digitizes the analog signal, thereby generating a digital image.

QA-WS 2 includes a general purpose computer (workstation or the like), one or two high-resolution displays, and an input device, such as a keyboard and mouse. The computer includes software for supporting an inspection engineer. QA-WS 2 receives a medical image that complies with DICOM standard from modality 1, performs normalization processing (EDR processing) and processing for adjusting the quality of the medical image, and displays the processed image and contents of the auxiliary information on a screen by the functions realized by executing the software program, thereby prompting verification of the inspection engineer. Then, QA-WS 2 transfers the medical image verified by the inspection engineer to image management server 4.

Image management server 4 is a general purpose computer, with relatively high processing power, having a software program that provides the function of database management system (DBMS). Image management server 4 includes a large capacity storage. The storage may be a large capacity hard disk device connected to image management server 4 via a data bus or a disk device connected to network 5.

Image management server 4 includes therein medical images associated with auxiliary information. The auxiliary information includes, for example, an image ID for identifying each medical image, a patient ID for identifying each subject, an inspection ID for identifying each inspection, a unique ID (UID) allocated to each medical image, inspection date and time when the medical image is generated, the type of the modality used for obtaining the medical image, patient information such as the name, age, and gender, region of inspection (imaged region), information of imaging conditions, and the like, which are managed as XLM or SGML data. Some of the medical images obtained by radiographic machines of different manufactures may have auxiliary information having different contents.

Image management server 4 further includes therein past medical images read out by a scanner and digitized. It is often the case that such images obtained by old-type radiographic machines do not include imaging conditions or the like in the auxiliary information.

When a retrieval request is received from radiological reading workstation 3, image management server 4 retrieves a requested medical image and sends the image to requesting radiological reading workstation 3.

Radiological reading workstation 3 is used by a radiological doctor for reading a medical image or generating a radiological report. The workstation includes a computer, one or two high-resolution displays, and an input device, such as a keyboard and mouse. The workstation performs the following, but not limited to, issuing a retrieval request to image management server 4, performing various types of image processing on a medical image received from image management server 4, displaying the medical image, automatically detecting and highlighting a lesion-like region in the medical image, supporting the generation of a radiological report, issuing a registration or retrieval request to a radiological report server (not shown) for a radiological report, and displaying a radiological report received from the radiological report server. The image processing program of the present invention is installed on radiological reading workstations 3 and functions as the image processing apparatus. The image processing of the present invention is not necessarily performed in radiological reading workstation 3. Instead, a separate image processing apparatus (not shown) may be connected to network 5, and the image processing may be performed by the apparatus in response to a processing request from radiological reading workstation 3.

Figure 2:
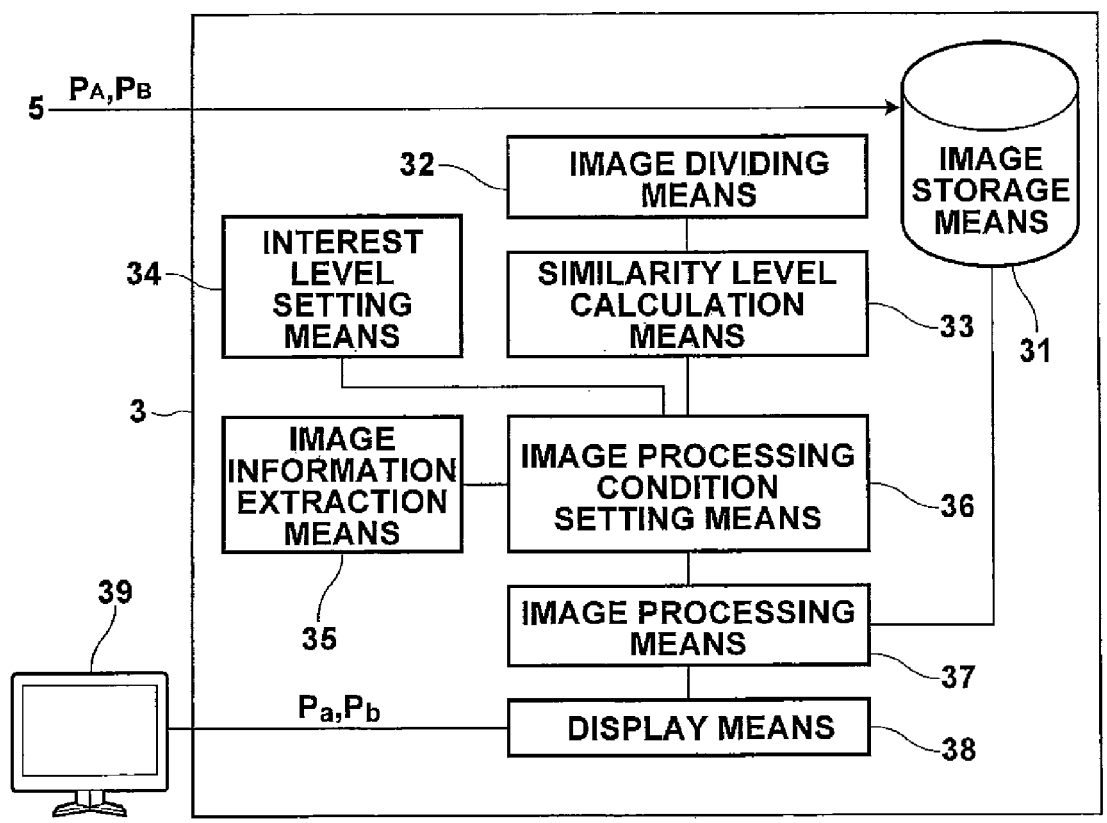
FIG. 2 is a schematic configuration diagram of an image processing apparatus.

As illustrated in FIG. 2, image processing apparatus 3 includes image storage means 31 for storing two target images, medical images $P_A$, $P_B$, for comparative reading, image dividing means 32 for dividing two medical images $P_A$, $P_B$ into a plurality of tissue regions, similarity level calculation means 33 for calculating a similarity level of each corresponding pair of the plurality of tissue regions divided by image dividing means 32 between two medical images $P_A$, $P_B$ based on the form of each tissue region thereof, interest level setting means 34 for setting an interest level of each corresponding pair, and image information extraction means 35 for extracting image information included in each tissue region of each of medical images $P_A$, $P_B$. The image processing apparatus 3 further includes image processing condition setting means 36 for obtaining a weight for each corresponding pair according to the similarity level and interest level, and setting an image processing condition for matching an image characteristic between the two medical images according to the weight using the image information of each corresponding pair, image processing means 37 for performing image processing on at least either one of the two target images, medical images $P_A$, $P_B$, for comparative reading according to the image processing condition, and display means 38 for comparably displaying the processed two medical images, medical images $P_A$, $P_B$, on a screen of display device 39.

Image characteristics include density value, contrast, tone, and the like. The contrast refers to difference in density value between bright and dark portions represented by density values. The tone refers to variation in thickness represented by density values or smoothness of the thickness variation.

Hereinafter, in the present embodiment, detailed description will be made of a case in which comparative reading is performed on two mammography images.

Image storage means 31 is a large capacity storage device, such as hard disk, and has stored therein two mammography images (medical images) $P_A$, $P_B$ obtained by issuing a retrieval request to image management server 4.

Image dividing means 32 divides tissues forming regions imaged in each of mammography images $P_A$, $P_B$ into tissue regions on the images. Each tissue (mammary gland, fat, pectoral muscle, and the like) appears in mammography images $P_A$, $P_B$ with a distinctive density value. Mammography images $P_A$, $P_B$ are obtained by radiation which has passed through a plurality of tissues. Therefore, even the same tissue region appears in different density values on mammography images $P_A$, $P_B$ influenced by overlapping extent of tissues and the ratio thereof. Consequently, the division of images into each tissue region is performed in the following manner. That is, first, each of the images is divided into rough regions based on the density value. Then, the rough regions are accurately divided into each tissue region forming a breast based on the shapes and positions of the regions.

Mammography images $P_A$, $P_B$ may be divided largely into a breast region where a breast is imaged and a pectoral muscle region where a pectoral muscle is imaged. The tissue in the breast region includes mammary gland and fat, so that the breast region is further divided into a mammary gland region which includes more mammary gland and a fatty region which includes more fatty area and less mammary gland.

More specifically, the following method may be used. That is, mammography images $P_A$, $P_B$ are roughly divided into a pectoral muscle region and a fatty region, each of which is referred to as a sampling region. Then a density value corresponding to the boundary between the pectoral muscle region and fatty region, and an average density value of the pectoral muscle region are obtained based on the distribution of density values in each sampling region. Further, a density threshold value is calculated for separating the mammary gland region from the fatty region based on these density values, thereby determining the mammary gland region and fatty region. (For more information, reference is made to, for example, Japanese Unexamined Patent Publication No. 2005-065855 filed by the present applicant).

Similarity level calculation means 33 compares the characteristics of the forms of each corresponding pair of the tissue regions obtained by dividing mammography images $P_A$, $P_B$ and calculates the similarity level thereof. More specifically, similarity level calculation means 33 extracts the areas, shapes, and the like of each corresponding pair of tissue regions and calculates the similarity level.

Figure 3A:
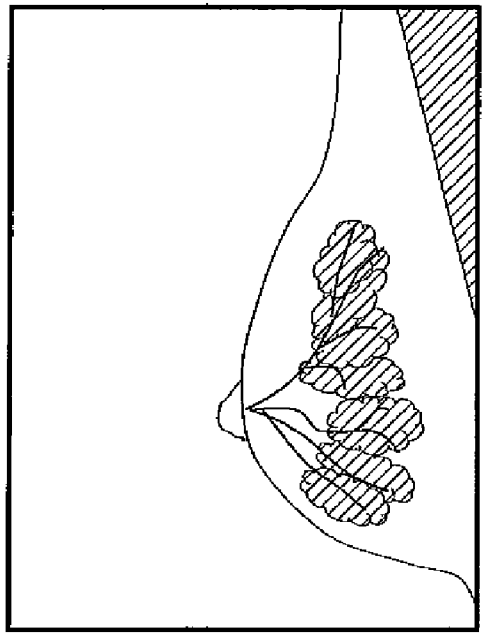
FIGS. 3A, 3B illustrate the difference in appearance of a pectoral muscle arising from the difference in positioning.
Figure 3B:
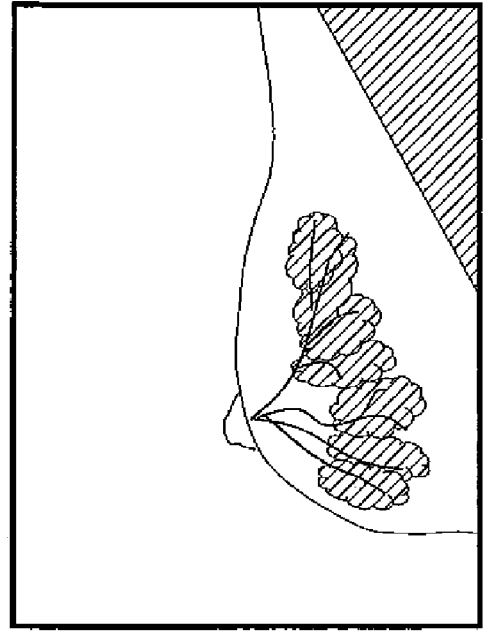

When imaging a breast, the breast placed on an imaging platform is pressed from above by a pressing plate before the imaging takes place by irradiating radiation, since the breast is a solid organ having a certain thickness. Otherwise, a tumor may not be imaged sometimes hindered by a mammary gland, fat, or a blood vessel. Consequently, the imaged state of pectoral muscle varies greatly depending on the positioning of the breast at the time of imaging. In particular, in MLO imaging shown in FIGS. 3A, 3B, the shape and size of the pectoral muscle appearing on the mammography image differs greatly.

Figure 4A:
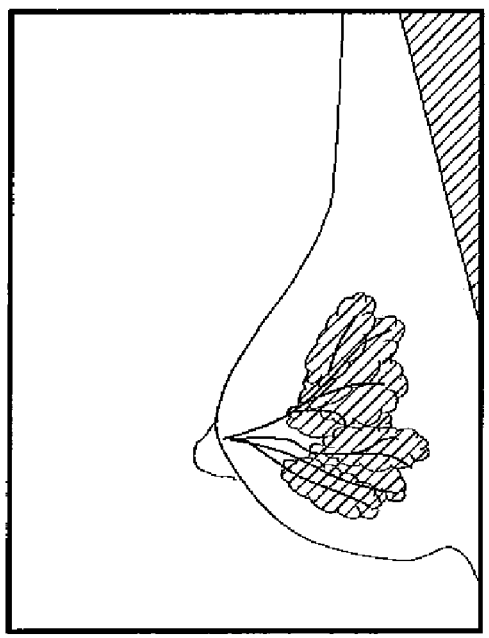
FIGS. 4A, 4B illustrate the difference in stretched extent of mammary gland tissue.
Figure 4B:
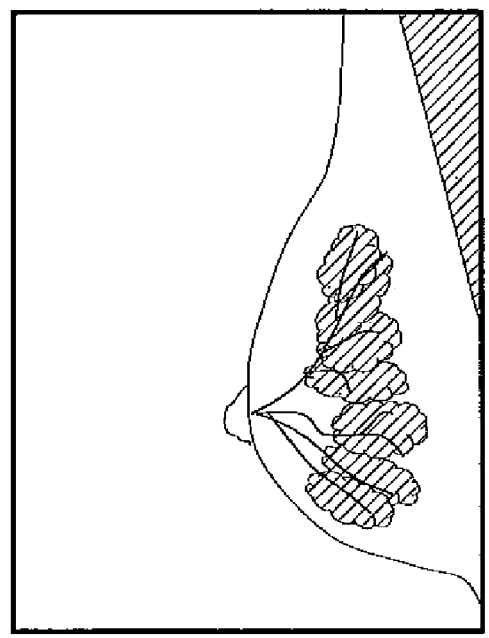

In the mean time, the breast region is also influenced by the positioning. FIGS. 4A, 4B illustrate the difference in stretched extent of mammary gland. When taking a mammography image, it is necessary for the radiographer to press the breast while sufficiently stretching the mammary gland by a hand. Where the breast is pressed without sufficiently stretched or mammary gland is moved downward when the hand is withdrawn from the pressing plate, the result is like that shown in FIG. 4A. In this way, the position and extent where mammary gland appears differ depending on the positioning. Where two mammography images $P_A$, $P_B$ of the same breast of the same subject taken at different times do not include a tumor, not having any significant difference between them, and the positioning is not changed largely, the areas of the mammary gland regions do not differ greatly, though the positions and extents where mammary gland appears may slightly differ. Accordingly, the areas of the mammary gland regions when the mammography images are divided into tissue regions by image dividing means 32 are the same.

On the other hand, even for the same breast of the same subject, if one of two mammography images $P_A$, $P_B$ includes a tumor, then when the mammography images are divided into tissue regions by image dividing means 32, the tumor is included in the mammary gland region, since the tumor has a density value similar to that of the mammary gland and often appears overlapping with the mammary gland region. Accordingly, it can be said that the area of the mammary gland region that includes a tumor is larger than that of the mammary gland region not including a tumor. Consequently, the similarity level of each corresponding pair of tissue regions is calculated by the formula below.

$$\text{Similarity Level} = 1 - \frac{2 \times \|(\text{Area } A) - (\text{Area } B)\|}{(\text{Area } A) + (\text{Area } B)}$$

where, (Area A) represents the area of a tissue region in mammography image $P_A$ and (Area B) represents the area of the corresponding tissue region in mammography image $P_B$. Here, similarity levels of a plurality of tissue regions are obtained depending on the imaged region. In the case of mammography images $P_A$, $P_B$, the similarity levels are obtained as illustrated in Table 1 below.

TABLE 1

| Tissue | Similarity Level |
| --- | --- |
| Mammary Gland Region | 0.8 |
| Fatty region | 0.9 |
| Pectoral Muscle Region | 0.4 |
| Outside Breast Region | 0.9 |

As described above, it is desirable that the similarity level calculation method based on the areas of each corresponding pair of tissue regions be used for a tissue region that changes its shape due to a slight difference in the positioning of a breast at the times of imaging in order not to become too sensitive to the difference in the positioning.

Interest level setting means 34 receives the interest level of each tissue region inputted by a user and sets the interest level of each tissue region. In the case of a breast, a tumor is likely to grow in the mammary gland region which includes more mammary gland, and hence the interest level is higher that other tissue regions. Thus, in order to make an interest region, such as the mammary gland region and the like, to be more observable, the interest levels are set such that the influence of non-interest regions, such as fatty region, pectoral muscle region, and the like becomes small. For example, the interest levels are set as in Table 2 below.

TABLE 2

| Tissue | Similarity Level |
| --- | --- |
| Mammary Gland Region | 0.5 |
| Fatty region | 0.3 |
| Pectoral Muscle Region | 0.2 |
| Outside Breast Region | 0.0 |

Figure 5A:
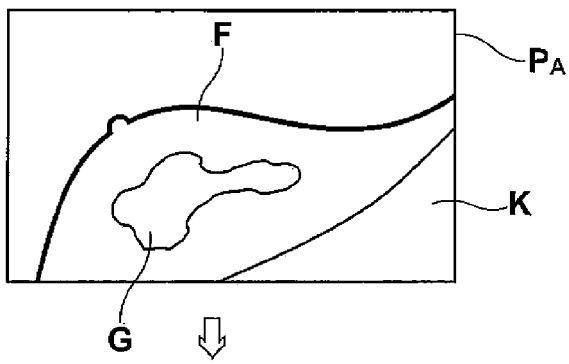
FIGS. 5A to 5D illustrate example histograms of a first mammography image.
Figure 5B:
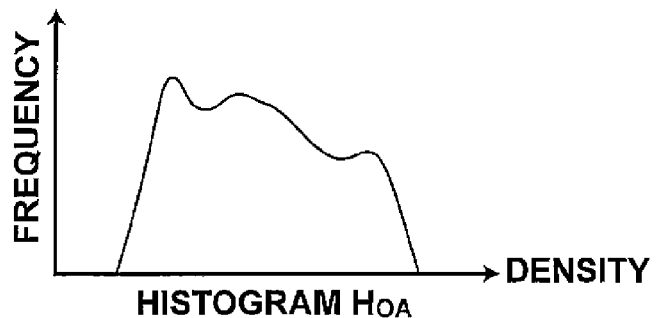

Image information extraction means 35 extracts image information from each tissue region of mammography images $P_A$, $P_B$. Here, description will be made of a case in which a histogram of density values of each tissue region is obtained as the image information. Mammary gland appears in mammography images $P_A$, $P_B$ as a white and high intensity tissue region, and the fatty region has a lower intensity in comparison with the mammary gland. In this way, the density values in each tissue region tend to be distributed in a specific range. Histogram $H_{OA}$ of density values of the entire breast of mammography image $P_A$ (FIG. 5A) becomes like that shown in FIG. 5B. Further, Histograms $H_{OA-G}$, $H_{OA-F}$, $H_{OA-K}$ of mammary gland region G, fatty region F, and pectoral muscle region K of mammography image $P_A$ are obtained like those shown in FIG. 5C. Likewise, Histogram $H_{OB}$ of density values of the entire breast of mammography image $P_B$ (FIG. 6A) becomes like that shown in FIG. 6B. Further, Histograms $H_{OB-G}$, $H_{OB-F}$, $H_{OB-K}$ of mammary gland region C, fatty region F, and pectoral muscle region K of mammography image $P_B$ are obtained like those shown in FIG. 6C.

Image processing condition setting means 36 obtains a weight for each corresponding pair of tissue regions between two mammography images $P_A$, $P_B$ according to the similarity level and interest level thereof, sets an image processing condition for matching image characteristics between the two medical images according to each weight using image information included in each corresponding pair of tissue regions. Mammography images $P_A$, $P_B$ to be compared may be those obtained by the same radiographic machine at different times, or those obtained by different radiographic machines. Where the imaging conditions at the time of imaging or radiographic machines used are different, the images may sometimes look slight differently even for a region of the same subject not having any significant change. Accordingly, it is preferable to modify the image characteristics such that a region not having any significant change appears substantially identical in the images, but at the same time it is necessary to allow difference in a region that has changed to be recognizable.

When considering how to make the mammography images $P_A$, $P_B$ look identical, the following may be conceivable. In a case where there is not a lesion, the image characteristics may be matched based on the image information of an interest region, e.g., mammary gland region, and information of a non-interest region, e.g., the pectoral muscle region may be disregarded. On the other hand, where one of the two mammography images includes a lesion, if the image characteristics are matched based only on the image information of the mammary gland region, the difference in the tissue arising from the presence or non-presence of a lesion may be reduced. In this case, it is preferable to use image information of the entire breast including the pectoral muscle. The appearance of the pectoral muscle, however, changes greatly depending on the positioning, and the density value and contrast thereof change. Therefore, where the positioning is changed, it is better not to use image information of the non-interest region, i.e., the pectoral muscle region.

Where the positioning is not changed significantly, image information of the pectoral muscle region is also used, since it is thought that the area of the pectoral muscle region does not change significantly. On the other hand, where the area of the pectoral muscle region is changed significantly, it is thought that the positioning is changed. Therefore, it is better not to use the image information of the pectoral muscle region in order to obtain more precise matching of image characteristics.

In the mean time, where imaging is performed while the mammary gland is not stretched sufficiently as in FIG. 4A, the mammary gland region has a low contrast and appears more whitish. When image characteristics of two mammography images with differently stretched mammary glands are matched based only on the mammary gland regions, difference arising from the difference in the amount of mammary gland which should be left as it is may also be eliminated. Further, the area or shape of the mammary gland region may sometimes change depending on the presence or non-presence of a lesion (for example, the area of a mammary gland region that includes a lesion, such as a tumor or the like, becomes wider than that of a mammary gland region without a tumor).

Where the form, such as the area or shape, has changed, it is thought to be better to reduce the influence of the changed tissue region. Also, it is thought to be better to make the influence of an interest region greater while reducing the influence of a non-interest region. Therefore, a weight for each tissue region is determined according to a change in the form and interest level thereof, thereby determining the image processing condition.

Thus, from the similarity level of the form (area or shape) and interest level of each corresponding pair of tissue regions, the weight of each corresponding pair of tissue regions is determined as (similarity level)×(interest level). Then, the image processing condition is determined according to what extent the image characteristics of each of corresponding pair of tissue regions are matched based on the weights.

That is, when a corresponding pair of tissue regions between two mammography images $P_A$, $P_B$ has a high similarity level and a high interest level, the weight becomes great. Therefore, the image processing condition of the corresponding pair of tissue regions is set such that the matching level thereof between the two images becomes high. On the other hand, when a corresponding pair of tissue regions has a low similarity level influenced by a lesion or the like, though having a high interest level, the weight becomes small. Therefore, the image processing condition of the corresponding tissue regions is set such that the matching level thereof between the two images becomes low.

For example, the weights are set as shown in Table 3 below from similarity levels shown in Table 1 and interest levels shown in Table 2.

TABLE 3

| Tissue | Interest Level | Similarity Level | Weight |
|---|---|---|---|
| Mammary Gland Region | 0.5 | 0.8 | 0.40 |
| Fatty region | 0.3 | 0.9 | 0.27 |
| Pectoral Muscle Region | 0.2 | 0.4 | 0.08 |
| Outside Breast Region | 0.0 | 0.9 | 0.00 |

When images of the same region look alike, it is often the case that the contrasts and tones are similar, as well as density values. Here, a method for determining the image processing condition will be described. The method uses the density value histogram and weight of each tissue region of two mammography images $P_A$, $P_B$ to be compared and determines the image processing condition such that the greater the weight of a tissue region, the more closely approximated in the density value, contrast, tone, and the like of the corresponding tissue regions between the two images.

Figure 5C:
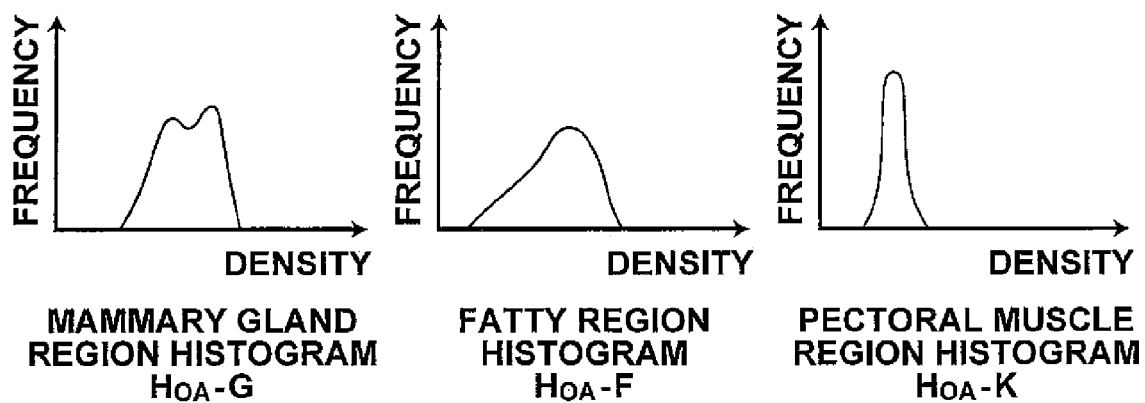
Figure 5D:
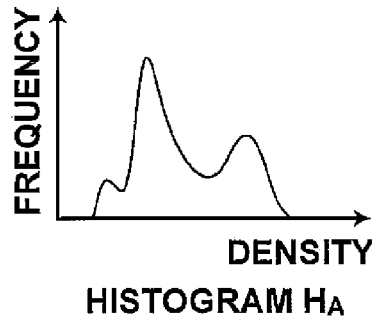
Figure 6A:
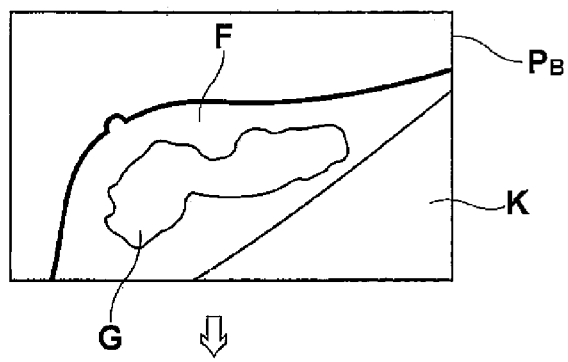
FIGS. 6A to 6D illustrate example histograms of a second mammography image.
Figure 6B:
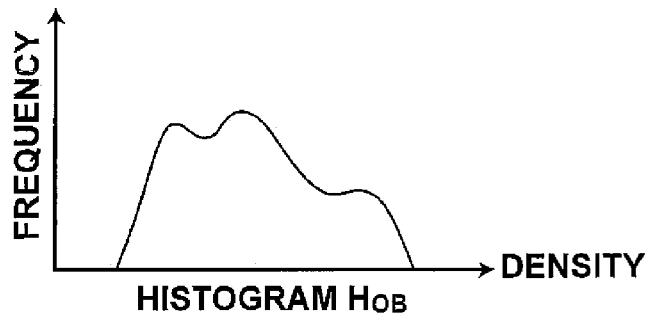
Figure 6C:
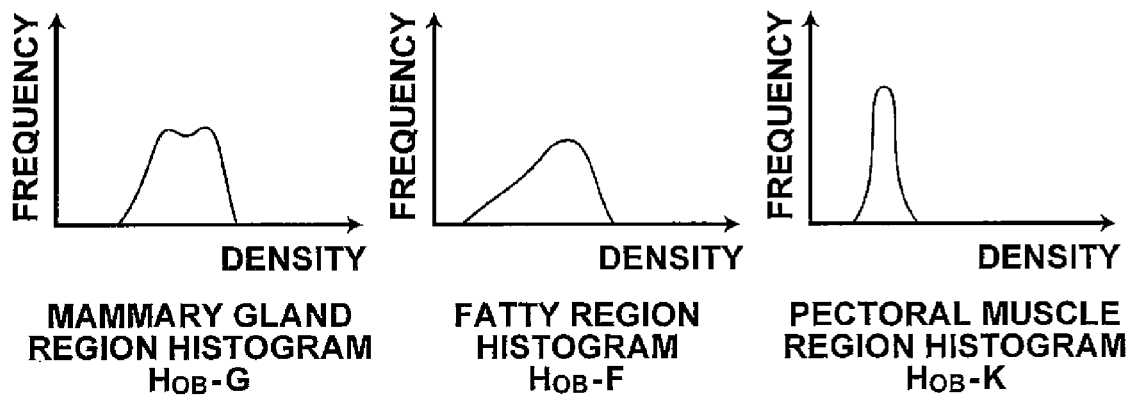
Figure 6D:
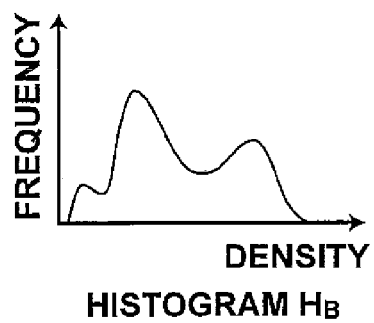

First, histogram $H_A$ shown in FIG. 5D is obtained by multiplying the histograms of the respective tissue regions of mammography image $P_A$ shown in FIG. 5C with the weights (0.40, 0.27, 0.08) and combining them together. Likewise, histogram $H_B$ shown in FIG. 6D is obtained by multiplying the histograms of the respective tissue regions of mammography image $P_B$ shown in FIG. 6C with the weights and combining them together. Then, the density values of mammography images $P_A$, $P_B$ are adjusted such that histogram $H_A$ and histogram $H_B$ correspond to each other. In this way, influence of a tissue region with a greater weight may be increased, while influence of a tissue region with a smaller weight may be decreased.

Figure 7:
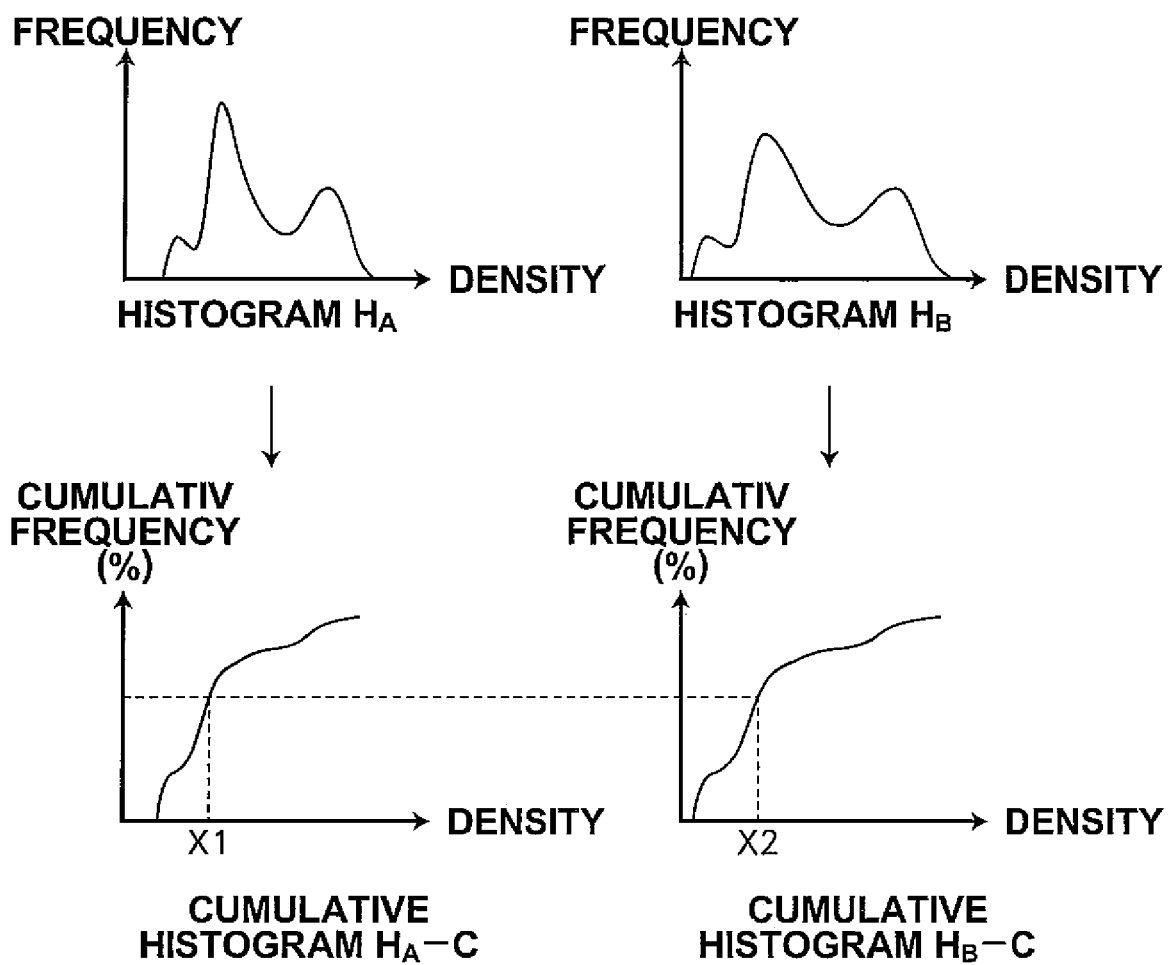
FIG. 7 illustrates a method for setting an image processing condition using cumulative histograms.

More specifically, this is realized by generating cumulative histograms $H_{A-C}$, $H_{B-C}$ shown in FIG. 7 and converting the density value of either one of the mammography images, mammography image $P_A$ (or $P_B$), to the density value of the other mammography image, mammography image $P_B$ (or $P_A$) with the same cumulative frequency. Generation of a density conversion table of X1→X2 (X2→X1) with respect to all of the density values allows matching between histograms $H_A$, $H_B$. Then, the obtained density conversion table between mammography images $P_A$, $P_B$ is set as the image processing condition.

In this way, by generating weighted histograms and obtaining image processing condition, the overall image characteristics may be approximated between the two mammography images in which influence of an unwanted region to be referenced is reduced while influence of a region with a high interest level is increased.

Here, the description has been made of a case in which the image characteristics, such as density value, contrast, tone, and the like of either one of the two mammography images are matched to the other by matching the weighted histograms, but the image processing condition may be set such that the image characteristics of both images are matched to those of a certain reference image.

Image processing means 37 performs image processing on either one of the two mammography images, mammography images $P_A$, $P_B$, so as to appear identical according to the density table. Alternatively, image processing means 37 may perform image processing on both images, mammography images $P_A$, $P_B$, such that the appearances thereof become identical to that of the reference image.

Figure 8:
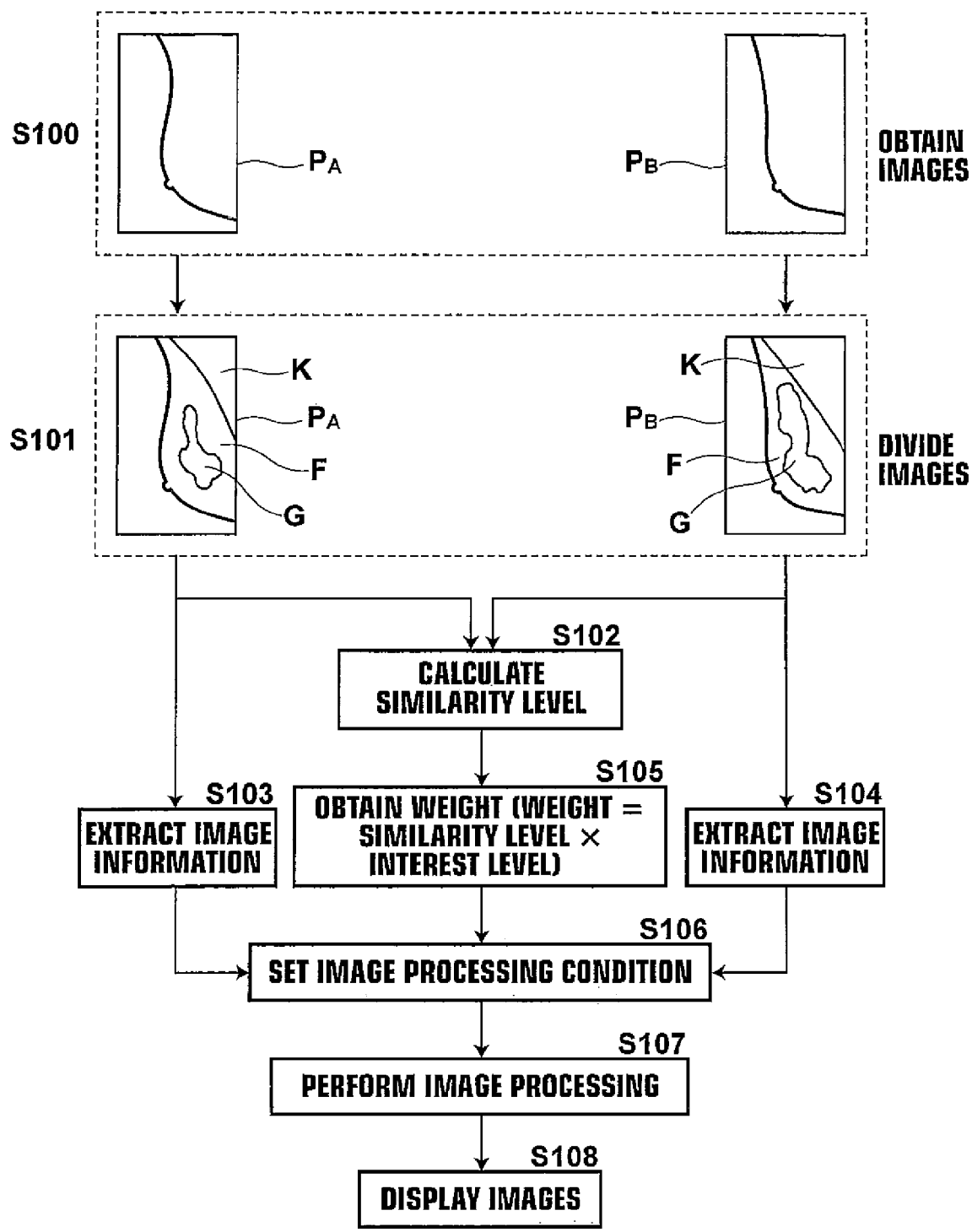
FIG. 8 is a flowchart illustrating a flow when image processing is performed on two mammography images.

Hereinafter, functions of the image processing apparatus according to an embodiment of the present invention will be described in detail. FIG. 8 is a flowchart illustrating a flow of image processing for matching the appearances of two mammography images using the medical information system incorporating the image processing apparatus according to an embodiment of the present invention.

First, prior to start radiological reading, an interest level input screen (not shown) is displayed on the screen of radiological reading workstation 3 by interest level setting means 34. A user, such as a radiological doctor, inputs and sets interest levels of mammary gland region C, fatty region F, pectoral muscle region K, and outside breast region (normally a value of "0" is set since it is not the target region for reading). Here, an arrangement may be adopted in which, once interest levels are set, they are used as default values and the interest level input screen is not displayed unless a setting change operation is performed.

When a retrieval request for reading out target mammography images $P_A$, $P_B$ is issued by a radiological doctor or the like, radiological reading workstation 3 sends the retrieval request to image management server 4 and obtains two reading target mammography images $P_A$, $P_B$ (S100), which are stored in image storage means 31.

Next, image dividing means 32 divides each of the two reading target images, mammography images $P_A$, $P_B$, into mammary gland region G, fatty region F, and pectoral muscle region K (S101). Further, similarity level calculation means 33 calculates the similarity level of each corresponding pair of tissue regions between two mammography images $P_A$, $P_B$ based on the area of each tissue region thereof (S102).

Next, image information extraction means 35 obtains histograms $H_{OA-G}$, $H_{OA-F}$, and $H_{OA-K}$ of mammary gland region G, fatty region F, and pectoral muscle region K of mammography image $P_A$ and histograms $H_{OB-G}$, $H_{OB-F}$, and $H_{OB-K}$ of mammary gland region C, fatty region F, and pectoral muscle region K of mammography image $P_B$ (S103, S104).

Image processing condition setting means 36 obtains a weight for each corresponding tissue regions from the similarity level and interest level (S105). Then, image processing condition setting means 36 obtains histogram $H_A$ by multiplying histograms $H_{OA-G}$, $H_{OA-F}$, and $H_{OA-K}$ of mammary gland region G, fatty region F, and pectoral muscle region K of mammography image $P_A$ with the corresponding weights and adding them together, and histogram $H_B$ by multiplying histograms $H_{OB-G}$, $H_{OB-F}$, and $H_{OB-K}$ of mammary gland region G, fatty region F, and pectoral muscle region K of mammography image $P_B$ with the corresponding weights and adding them together. Further, image processing condition setting means 36 generates cumulative histograms $H_{A-C}$, $H_{B-C}$ shown in FIG. 7 from weight-added histograms $H_A$, $H_B$, thereby generating a density conversion table that allows density conversion between two mammography images $P_A$, $P_B$ based on the cumulative frequency and sets the table as the image processing condition (S106).

Image processing means 37 performs image processing on mammography images $P_A$, $P_B$ according to the provided density conversion table (S107), and display means 38 displays processed mammography images $P_A$, $P_B$ on the screen of display device 39 (S108).

Figure 9:
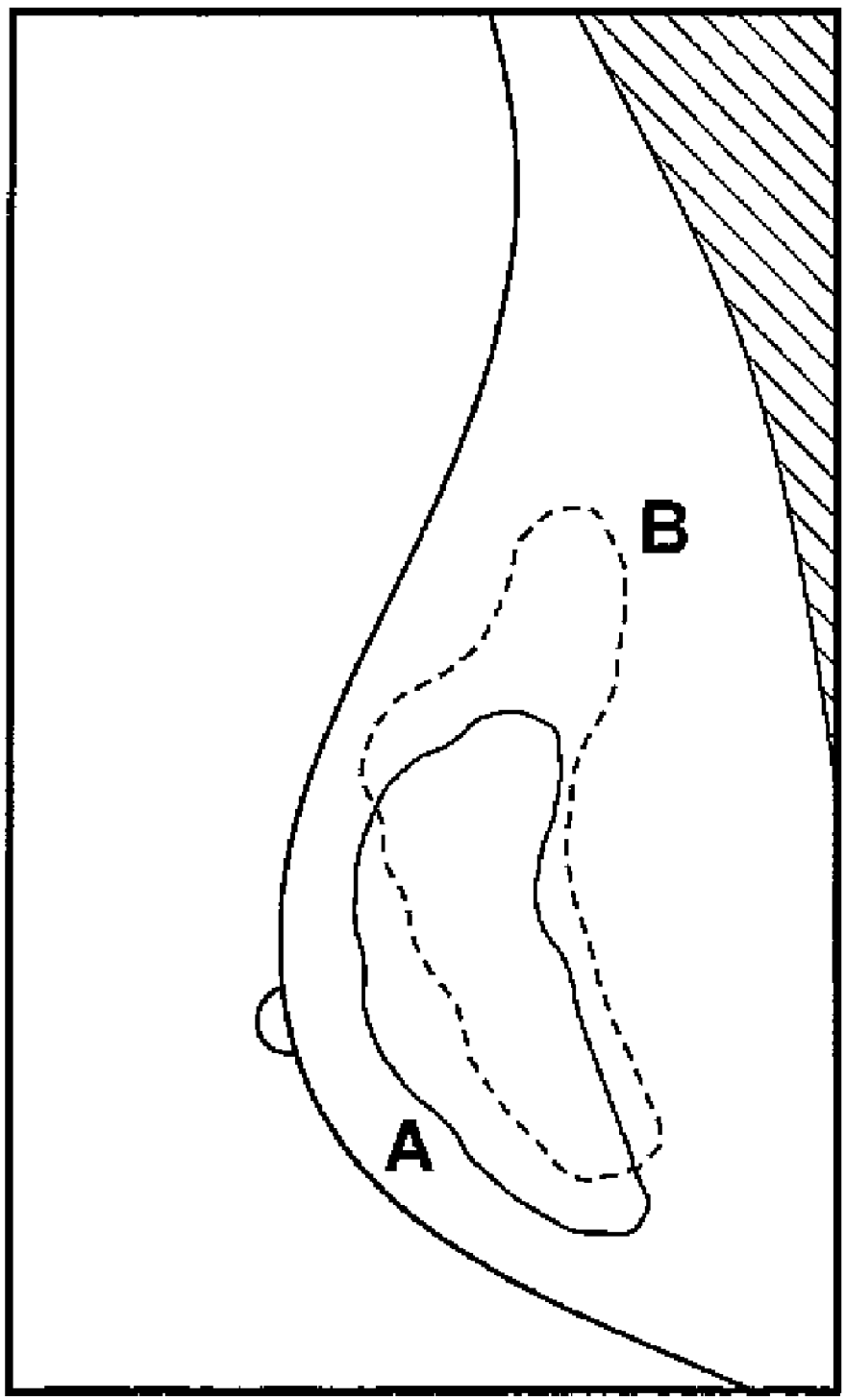
FIG. 9 illustrates how to obtain a similarity level based on the extent of overlapping.

Here, the description has been made of a case in which the similarity level is calculated based on the area of each tissue region of two mammography images $P_A$, $P_B$, but the similarity level of the form of each tissue region may be obtained by the overlapping extent of the areas of tissue regions when two mammography images $P_A$, $P_B$, are superimposed on top of another. For example, FIG. 9 illustrates the overlapping extent of two mammography images $P_A$, $P_B$ when superimposed on top of another by aligning the counters of the breasts (A represents the mammary gland region of one image, and B represents that of the other). In this case, the similarity level may be calculated by the following formula.

$$\text{Similarity Level} = \frac{\text{Overlapping Area between } A \text{ and } B}{(\text{Area } A) + (\text{Area } B)}$$

Alternatively, the similarity level may be obtained according to the matching level in the shape of each of the mammary gland region, pectoral muscle region, and fatty region between the two mammography images.

In the description above, comparative reading of mammography images has been illustrated as an example. For a region, such as chest, which is not significantly influenced by the positioning, the similarity level of each tissue region between the images may be calculated based not only on the areas but also the matching level of the shapes.

Further, the description has been made of a case in which two medical images are compared, but the image processing may be performed on three or more medical images such that they all appear identical in the same manner as described above.

Still further, in the description above, the weight is obtained by multiplying the similarity level with the interest level, but a correspondence table that indicates correspondence between similarity and interest levels and weight may be provided in advance and the weigh may be obtained from the table.

Further, the description has been made of a case in which radiation images are used, but the advantageous effects for comparative reading may be obtained for those obtained by such modalities as CT (Computed Tomography), MRI (Magnetic Resonance Imaging), PET (Positron Emission Tomography), ultrasonic imaging system, and the like by performing the image processing thereon in the same manner as described above.

The software operating on each unit and the like may be installed thereon from a recording medium, such as CD-ROM or the like, or after downloaded from a server linked by a network, such as the Internet.

What is claimed is:

1. An image processing method, said method comprising:
   storing two medical images obtained by imaging the same region that includes a plurality of tissues;
   dividing each of the two medical images into a plurality of tissue regions corresponding to a plurality of tissues imaged in each medical image;
   calculating a similarity level by a computer processor for each corresponding pair of tissue regions from the plurality of tissue regions in each of the two medical images divided by said dividing, wherein said pairing in each corresponding pair of tissue regions is based on the form of each tissue region thereof;
   setting an interest level for said each corresponding pair;
   obtaining a weight for said each corresponding pair according to
   the similarity level calculated by said calculating and
   the interest level set by said interest level setting;
   setting an image processing condition for approximating an overall image characteristic between the two medical images based on image information included in said each corresponding pair such that the greater the weight of a corresponding pair, the higher the matching level of an image characteristic between the pair; and
   performing image processing by a computer processor on at least one of the two medical images according to said image processing condition.

2. The image processing apparatus as claimed in claim 1, wherein the form of each tissue region is the shape and/or area of the tissue region.

3. The image processing apparatus as claimed in claim 1, wherein the two medical images are mammography images, and the plurality of tissue regions are a mammary gland region, a fatty region, and a pectoral muscle region.

4. The image processing apparatus as claimed in claim 2, wherein the two medical images are mammography images, and the plurality of tissue regions are a mammary gland region, a fatty region, and a pectoral muscle region.

5. The image processing apparatus as claimed in claim 1, wherein the image characteristic is at least one of the density value, contrast, and tone.

6. The image processing apparatus as claimed in claim 2, wherein the image characteristic is at least one of the density value, contrast, and tone.

7. The image processing apparatus as claimed in claim 3, wherein the image characteristic is at least one of the density value, contrast, and tone.

8. The image processing apparatus as claimed in claim 4, wherein the image characteristic is at least one of the density value, contrast, and tone.

9. A computer readable non-transitory medium on which a program is recorded, wherein the program causes a computer to:
   store two medical images obtained by imaging the same region that includes a plurality of tissues;
   divide each of the two medical images into a plurality of tissue regions corresponding to a plurality of tissues imaged in each medical image;
   calculate a similarity level for each corresponding pair of tissue regions from the plurality of tissue regions in each of the two medical images divided by said dividing wherein said pairing in each corresponding pair of tissue regions is based on the form of each tissue region thereof;
   set an interest level for said each corresponding pair;
   obtain a weight for said each corresponding pair according to
   the similarity level calculated by said similarity level calculating and
   the interest level set by said interest level setting,
   and set an image processing condition for approximating an overall image characteristic between the two medical images based on image information included in said each corresponding pair such that the greater the weight of a corresponding pair, the higher the matching level of an image characteristic between the pair; and
   perform image processing on at least either one of the two medical images according to said image processing condition.

10. The image processing apparatus as claimed in claim 1, wherein said means for obtaining obtains said weight for each corresponding pair by multiplication of the similarity level calculated by said means for calculating and the interest level set by said means for setting.

11. The image processing apparatus as claimed in claim 1, wherein said means for obtaining sets the image processing condition for approximating the overall image characteristic between the two medical images based on image information included in said each corresponding pair such that a corresponding pair having a greater weight has a higher matching level of image characteristic which is at least one of density value, contrast, and gradation within the tissue regions between the pair, and wherein matching levels decrease as weights decrease.

12. The image processing apparatus as claimed in claim 1, wherein said similarity level for said each corresponding pair of tissue regions is calculated such that the similarity level is higher when areas of corresponding tissues within said two medical images are close to each other, and is lower as the difference in the areas increases.

13. The image processing apparatus as claimed in claim 1, wherein said similarity level for said each corresponding pair of tissue regions is calculated such that the similarity level is higher when overlaps between corresponding tissues in said two medical images are greater when two medical images are overlapped, and is lower when overlaps between corresponding tissues are less.

14. The image processing apparatus as claimed in claim 1, wherein said similarity level for said each corresponding pair of tissue regions is calculated based on degrees of similarity in shape.

15. The image processing apparatus as claimed in claim 1, wherein said two medical images are mammograms, and said plurality of tissues include mammary glands, fat, and pectoral muscles.

16. An image processing method, said method comprising:
   storing two medical images obtained by imaging the same region that includes a plurality of tissues;
   dividing each of the two medical images into a plurality of tissue regions corresponding to a plurality of tissues imaged in each medical image;

calculating a similarity level for each corresponding pair of tissue regions from the plurality of tissue regions in each of the two medical images divided by said dividing, wherein said pairing in each corresponding pair of tissue regions is based on the form of each tissue region thereof;

setting an interest level for said each corresponding pair;

obtaining a weight for said each corresponding pair according to
the similarity level calculated by said calculating and
the interest level set by said interest level setting;

setting an image processing condition for approximating an overall image characteristic between the two medical images based on image information included in said each corresponding pair such that the greater the weight of a corresponding pair, the higher the matching level of an image characteristic between the pair; and performing image processing on at least one of the two medical images according to said image processing condition.

17. An image processing apparatus, comprising:

a memory operatively programmed to store two medical images obtained by imaging the same region that includes a plurality of tissues; and a computer processor operatively programmed to
divide each of the two medical images into a plurality of tissue regions corresponding to a plurality of tissues imaged in each medical image, calculate a similarity level for each corresponding pair of tissue regions from the plurality of tissue regions in each of the two divided medical images, wherein said pairing in each corresponding pair of tissue regions is based on the form of each tissue region thereof, set an interest level for said each corresponding pair, obtain a weight for said each corresponding pair according to the calculated similarity level and the set interest level, set an image processing condition for approximating an overall image characteristic between the two medical images based on image information included in said each corresponding pair such that the greater the weight of a corresponding pair, the higher the matching level of an image characteristic between the pair; and perform image processing on at least one of the two medical images according to said image processing condition.

* * * * *